(12) United States Patent
Wang et al.

(10) Patent No.: US 8,147,906 B2
(45) Date of Patent: Apr. 3, 2012

(54) POLARIZER AND METHOD FOR PRODUCING THE SAME, AND LIQUID CRYSTAL DISPLAY DEVICE

(75) Inventors: Ke Wang, Beijing (CN); Zenghui Sun, Beijing (CN); Hongyu Liu, Beijing (CN); Junrui Zhang, Beijing (CN); Gang Wang, Beijing (CN); Xibin Shao, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 435 days.

(21) Appl. No.: 12/432,345

(22) Filed: Apr. 29, 2009

(65) Prior Publication Data

US 2009/0273744 A1 Nov. 5, 2009

(30) Foreign Application Priority Data

Apr. 30, 2008 (CN) .......................... 2008 1 0105754

(51) Int. Cl.
*B05D 5/06* (2006.01)
*C03C 17/00* (2006.01)
*G02B 1/10* (2006.01)

(52) U.S. Cl. .................................................. 427/163.1

(58) Field of Classification Search ........... 427/160–169
See application file for complete search history.

(56) References Cited

U.S. PATENT DOCUMENTS

2006/0185983 A1* 8/2006 Kumai et al. ................. 205/191

* cited by examiner

*Primary Examiner* — Michael Cleveland
*Assistant Examiner* — Michael G Miller
(74) *Attorney, Agent, or Firm* — Ladas & Parry LLP

(57) ABSTRACT

The present invention relates to a polarizer and a method for produce for producing the same, and an LCD device. The polarizer includes a glass substrate and a metal wire grating disposed on the glass substrate. The polarizer disposed on the LCD device can greatly lower cost of the polarizer and the LCD device. Besides, the polarizer does not absorb incident lights so as to greatly reduce energy loss of lights passing through the polarizer and improve the utilization rate of light energy. The method includes: disposing a cathode and an anode in parallel on one glass substrate; connecting the cathode and the anode to a direct current power supply; dropping solution containing metal positive ions between the cathode and the anode; disposing another glass substrate on the cathode and the anode; adjusting temperature of the solution until the solution is frozen to be ice; adjusting the temperature until a liquid layer appears between the one glass substrate and the ice; and supplying power for the cathode and the anode so as to obtain the polarizer, which can greatly simplify the producing process of the polarizer and lower the producing cost of the polarizer.

7 Claims, 5 Drawing Sheets

POLARIZER AND METHOD FOR PRODUCING THE SAME, AND LIQUID CRYSTAL DISPLAY DEVICE

CROSS-REFERENCE TO RELATED APPLICATIONS

This application claims priority to Chinese Patent Application No. 200810105754.8, filed on Apr. 30, 2008, entitled "Polarizer and Method for Producing the Same, and Liquid Crystal Display Device", which is incorporated herein by reference in its entirety.

FIELD OF THE INVENTION

The present invention relates to a display technique, particularly to a polarizer and a method for producing the same, and a liquid crystal display (LCD) device, which can reduce cost of the polarizer and improve light energy utilization.

BACKGROUND

Recently, with rapid development of display technologies, color LCD devices, especially small-size color LCD devices, are more and more widely used in people's daily life and production, especially in fields of mobile phone, personal digital assistant (PDA), global positioning system (GPS), E-book, and digital camera. Characteristics of a color LCD device, such as brightness, contrast and view angle are displaying indexes drawing great attention.

In terms of brightness, as liquid crystal material can not emit light by itself, all the existing LCD devices need backlights for providing light.

In prior art, an LCD device as shown in FIG. 1 includes a color filter substrate 1, a thin film transistor (TFT) array substrate 2, a liquid crystal layer 350 disposed between the color filter substrate 1 and the TFT array substrate 2, a polarizer 3 and a backlight 4. The color filter substrate 1 includes a glass substrate 380, a color pixel layer 370, and a transparent conductive layer 360. The backlight 4 includes a light source 310, a backlight plate 300, a reflective film 390, a light guide plate 320, a diffusion chip 330 and a selective permeation film 340.

The polarizer 3 includes a polyvinyl alcohol (PVA) film containing iodine or other dichroic dyes, a tri-acetate cellulose (TAC) fiber film attached at two sides of the PVA film, surface protection film pasted on a front surface of the PVA film, a bonding layer and a release film added to the other surface of the PVA film. The PVA film is a main function film layer providing polarization for the polarizer 3. Due to being stretched, the PVA film normally has low mechanical properties and becomes easily frangible. As such, when polarization basic substance is stretched to be a film, a layer of TAC film is commonly attached on two sides thereof in order to prevent the PVA film from retracting back. The surface protection film is adapted to prevent the PVA film from pollution and scratch. The bonding layer and the release film are adapted to be used in a subsequent pasting process, preservation and transferring protection. Further more, a functional film layer, for example a wide view angle film, may be pasted outside the TAC film according to acquirements.

In an LCD device, the lights emitted from the backlight 4 pass through the polarizer 3, the TFT array substrate 2, the liquid crystal layer 350 and the color filter substrate 1, and then most of the lights are absorbed, which results in that an ultimate light utilization rate is less than 5%. At least 50% of light energy will be expensed when the lights permeate the polarizer 3 because, according to light wave theory, any non-polarized light will be decomposed into two polarization components whose vibration directions are mutually perpendicular, one polarization component in an incident natural light passes through the polarizer 3, and the other one polarization component is absorbed by the polarizer 3, which results in a 50% loss of light energy and greatly reduces the utilization rate of light energy.

The method for producing the polarizer 3 specifically includes the following steps:

Pre-processing which includes: performing chemical processing to the TAC film so as to strengthen adhesion force to the PVA;

Stretching which includes: first, dipping a piece of flexible transparent substrate (commonly a PVA) with chemical activity into KI water solution containing iodine molecules ($I_2$), so that many iodine ions disperse and penetrate into an inner layer of the PVA plate within a few seconds; after heating at low temperature, stretching manually or mechanically to several times in length so that the PVA plate will become narrow and thin while it is getting longer; in which the PVA molecules are supposed to be at any angle and distributed randomly but gradually and consistently deflects in a direction of force after being stretched so that the iodine ions attached on the PVA plate will also possess directivity accordingly and form a long chain of iodine molecules. The iodine ions possess good dichroism so that they can absorb the beam field component parallel to an alignment direction thereof and only allow the beam field component in a vertical direction to pass so as to form a polarization function. The PVA film is dyed in the solution containing iodine and then pasted with the TAC film finishing the pre-processing;

Film pasting which includes: coating adhesive onto a surface of the release film for bonding glass and pasting with products finishing the stretching;

Cutting which includes: cutting products finishing film pasting into sizes desired by customers;

Checking which includes: checking size, characteristics and appearance for products finishing cutting.

The existing method for producing the polarizer is complicated and the main ingredient of the obtained polarizer is PVA and TAC which take up 70% of material used during polarizer producing which results in high cost.

SUMMARY

A subject of the present invention is to provide a polarizer and an LCD device so as to reduce cost of the polarizer and the LCD device and improve utilization rate of light energy.

Another subject of the present invention is to provide a method for producing the polarizer so as to simplify the producing process of the polarizer and reduce producing cost of the polarizer.

In order to realize the first subject, an embodiment of the present invention provides a polarizer including a glass substrate and a metal wire grating disposed on the glass substrate.

In the metal wire grating, a width of each metal wire is less than or equal to one third of wavelength of incident lights. The widths may all be 50 nm-150 nm. A cycle may be 100 nm-300 nm. Heights may all be 100 nm-200 nm. The metal wire grating may be made of copper or aluminium.

In order to realize the first subject, an embodiment of the present invention further provides an LCD device provided with any one of the above polarizers, including a TFT array substrate and a backlight, in which the polarizer is disposed between the TFT array substrate and the backlight, and a glass substrate of the polarizer is contacted with the TFT array substrate.

Another polarizer may be further disposed on a color filter substrate of the LCD device, and an alignment direction of a metal wire grating of the another polarizer is perpendicular to an alignment direction of a metal wire grating of the polarizer between the TFT array substrate and the backlight.

In order to realize the first subject, an embodiment of the present invention further provides an LCD device, including a TFT array substrate and a backlight, in which one metal wire grating is disposed between the TFT array substrate and the backlight.

In the above technical solutions, the polarizer is made of glass and metal, which greatly reduces cost of the polarizer and the LCD device. The polarizer does not absorb incident lights, which greatly reduces energy loss of lights passing through the polarizer and improves the utilization rate of light energy.

In order to realize the second subject, the present invention provides a method for producing the above polarizers, including:

disposing a cathode and an anode in parallel on one glass substrate;

connecting the cathode and the anode to a direct current power supply;

dropping solution containing metal positive ions between the cathode and the anode;

disposing another glass substrate on the cathode and the anode;

adjusting temperature of the solution until the solution is frozen to be ice;

adjusting the temperature until a liquid layer appears between the one glass substrate and the ice;

supplying power for the cathode and the anode; and switching off the power and removing the another glass substrate, the cathode and the anode.

In the above method solutions, the polarizer can be obtained simply by temperature adjustment and electric deposition reaction which can omit troublesome processes such as the pre-processing to the TAC film, the stretching to the PVA film, and the film pasting in the existing producing process of the polarizer so as to greatly simplify the producing process of the polarizer and lower the producing cost of the polarizer.

The technical solution of the present invention will be further described in details through the following drawings and embodiments.

DETAILED DESCRIPTION

Figure 1:
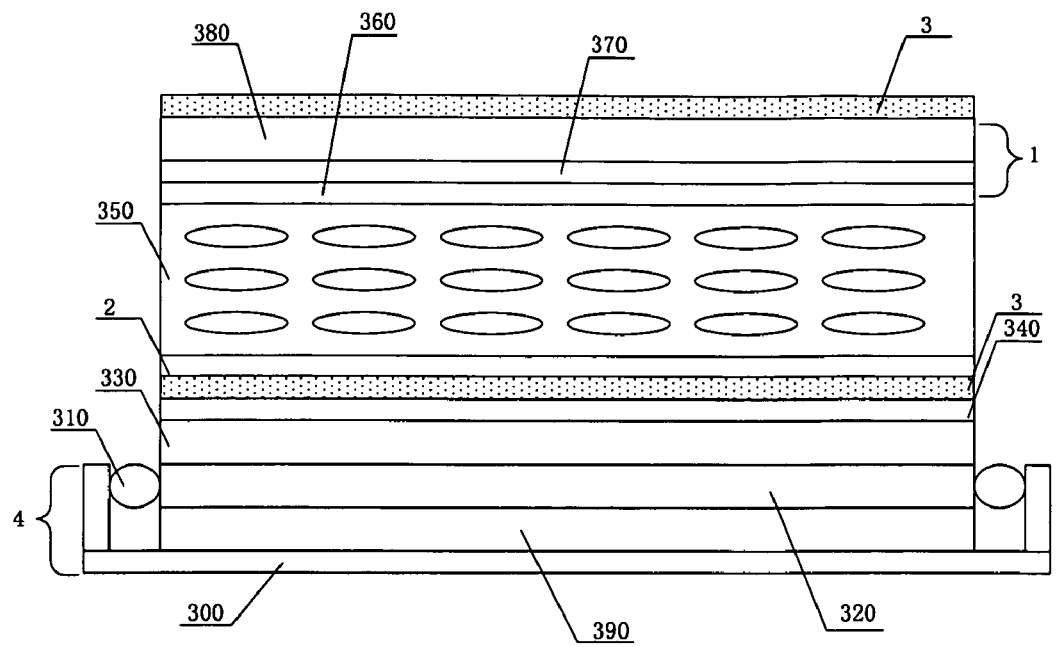
FIG. 1 is a structural view showing an LCD device in prior art.
Figure 2:
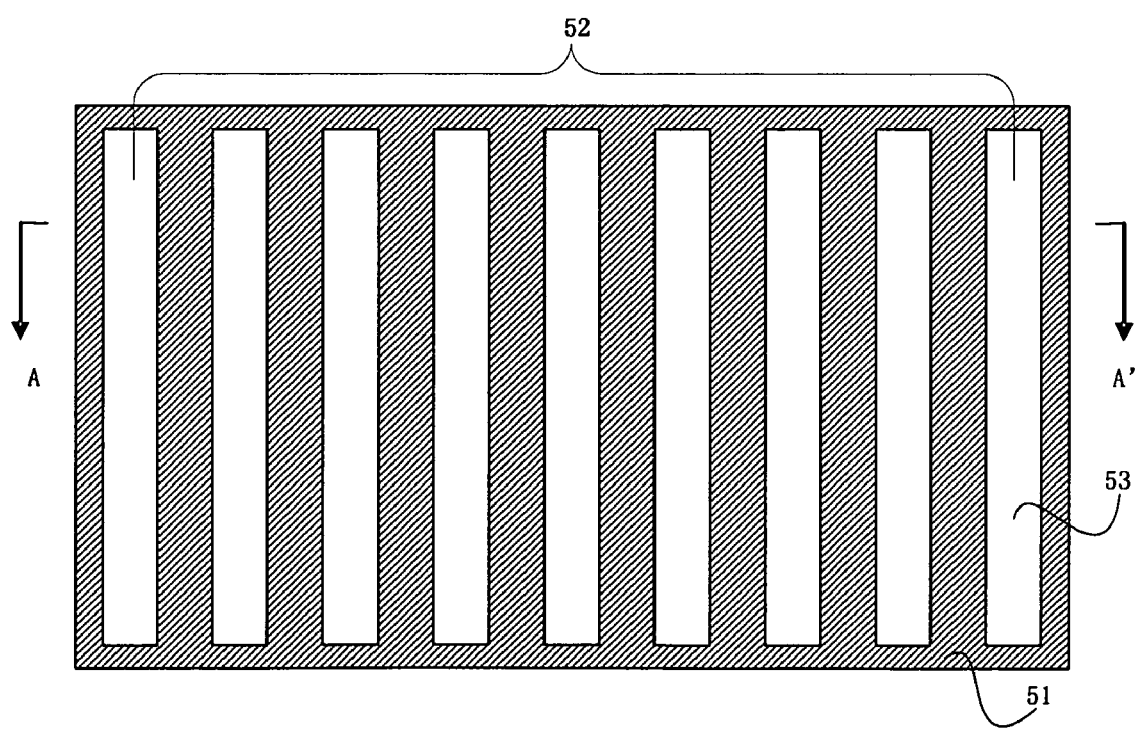
FIG. 2 is a planar structural view showing the polarizer embodiment of the present invention.
Figure 3:
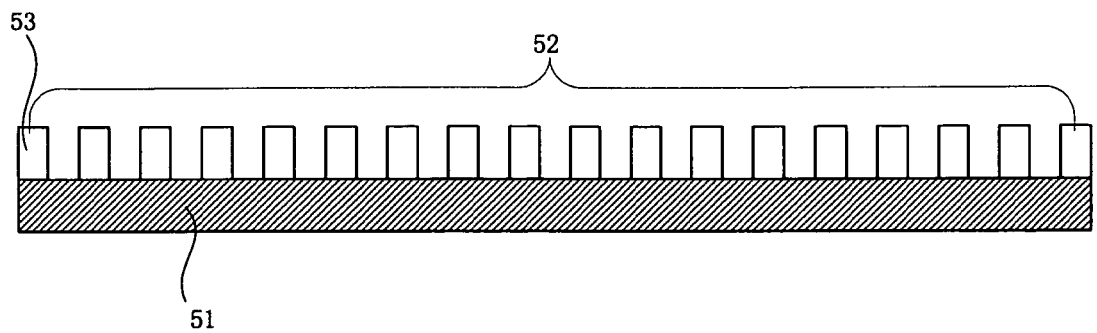
FIG. 3 is a cross-section view along a direction of A-A' in FIG. 2.

FIG. 2 is a planar structural view showing the polarizer embodiment of the present invention; FIG. 3 is a cross-section view along a direction of A-A' in FIG. 2. As shown in FIGS. 2 and 3, the polarizer includes a glass substrate 51 and a metal wire grating 52 disposed on the glass substrate 51. The metal wire grating 52 is formed by metal wires 53 aligning on the glass substrate 51 in parallel. A width of a metal wire 53 is less than or equal to one third of the wavelength of the incident lights. When the width is one tenth of the wavelength of the incident lights, the polarizer can get the most desirable polarization effect. In the present embodiment, the width of the metal wire 53 may be 50 nm-150 nm, a cycle which is a sum of the width of the metal wire 53 and distance between metal wires 53 may be 100 nm-300 nm. A height of the metal wire may be 100 nm-200 nm. The metal wires 53 may be made of metal with high conductivity and low cost such as copper and aluminium.

Figure 4:
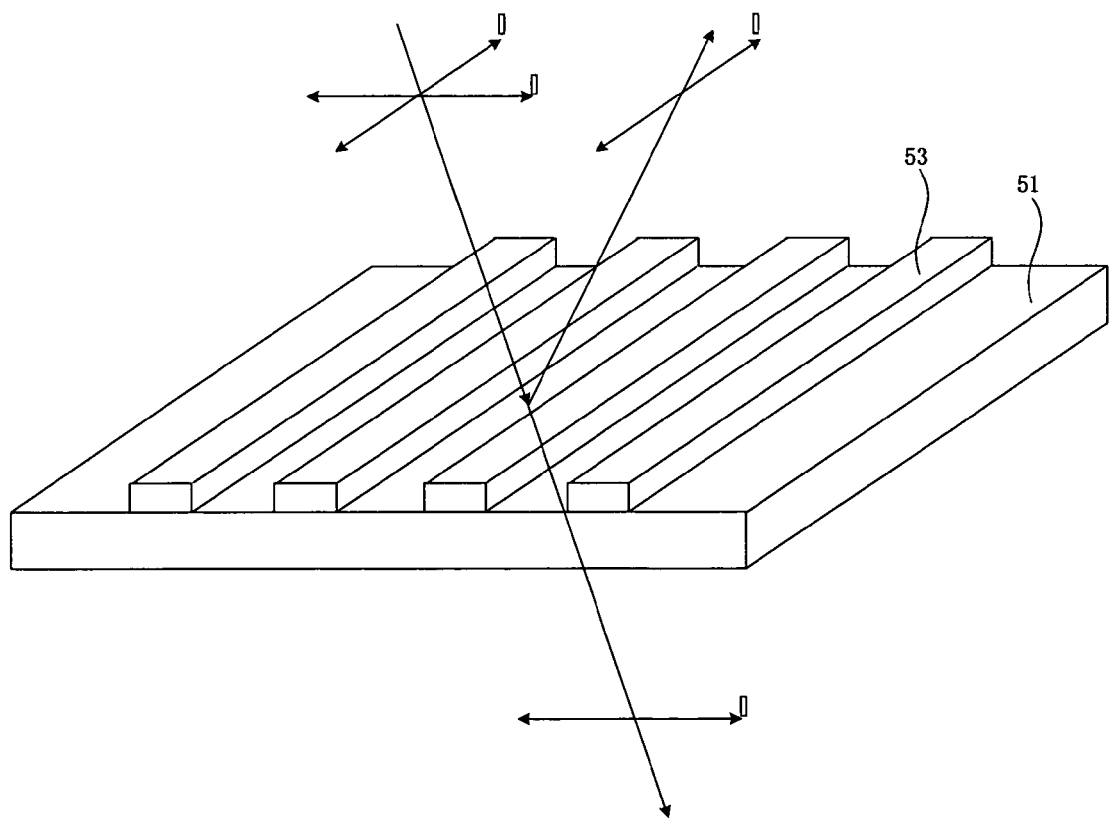
FIG. 4 is a polarization principle schematic view showing the polarizer embodiment of the present invention.

FIG. 4 is a polarization principle schematic view showing the polarizer embodiment of the present invention. As shown in FIG. 4, when a beam of light irradiates to the metal wire grating 52, lights perpendicular to the metal wire 53 permeate the polarizer while lights parallel to the metal wire 53 is reflected by the polarizer which plays a role of reflection.

The polarizer of the present embodiment is made of glass and metal which greatly lower the cost of the polarizer. Besides, the polarizer does not absorb incident lights so as to greatly reduce the loss of light energy passing through the polarizer and improve the utilization rate of the light energy.

Figure 5:
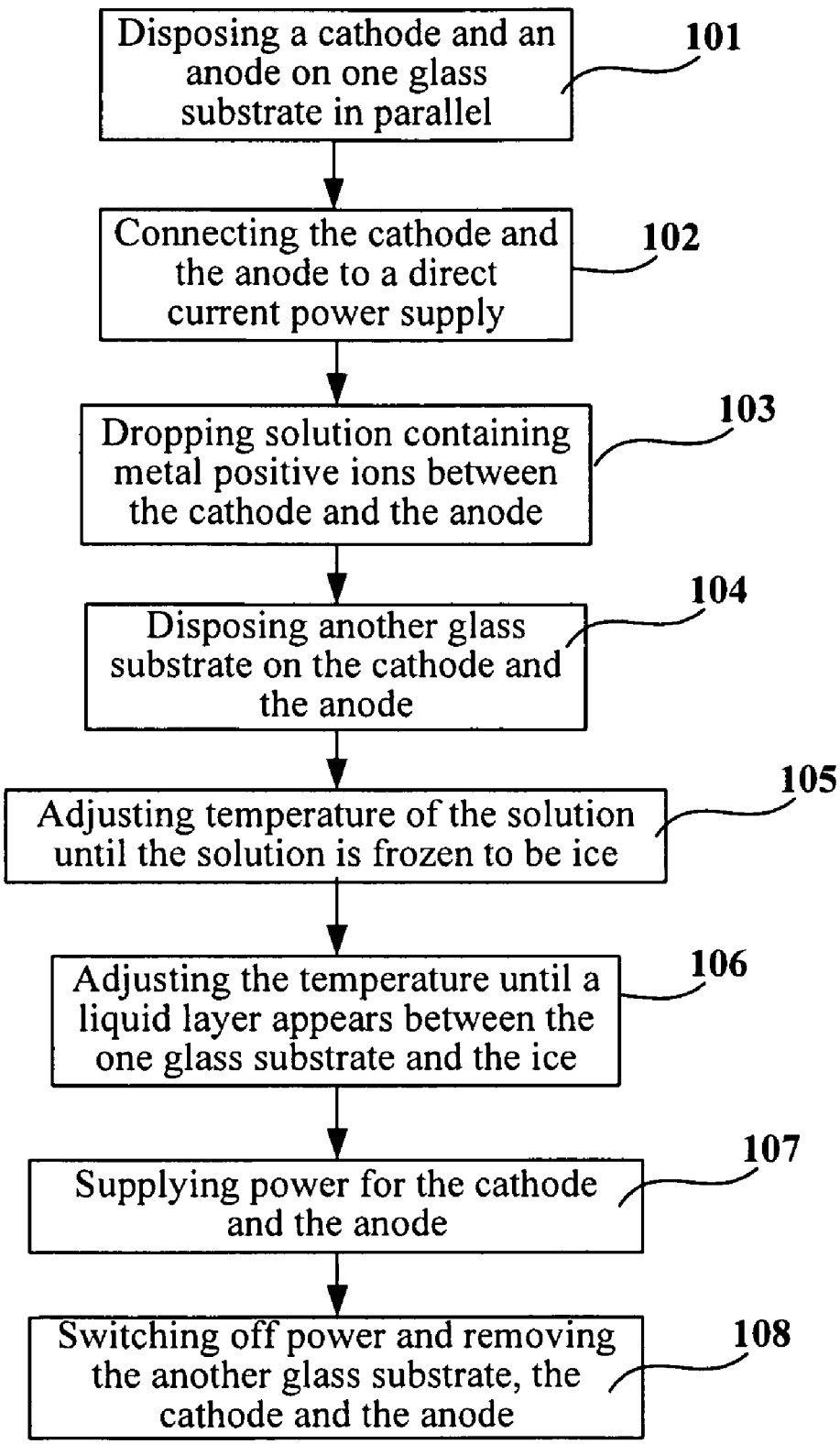
FIG. 5 is a flowchart showing the method embodiment for producing the polarizer of the present invention.
Figure 6:
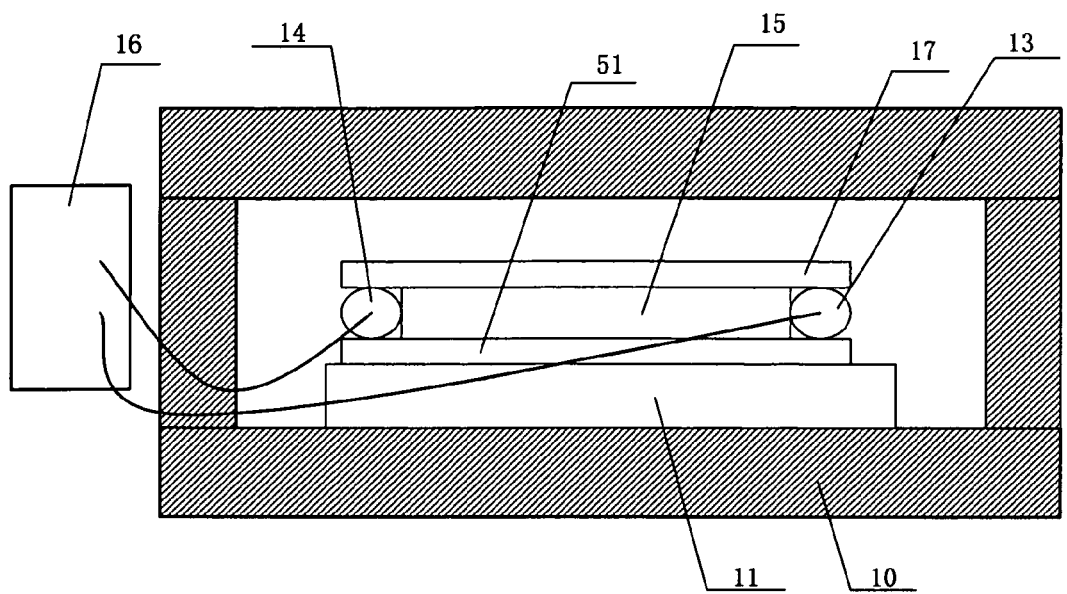
FIG. 6 is a process apparatus view showing the method embodiment for producing the polarizer of the present invention.
Figure 7:
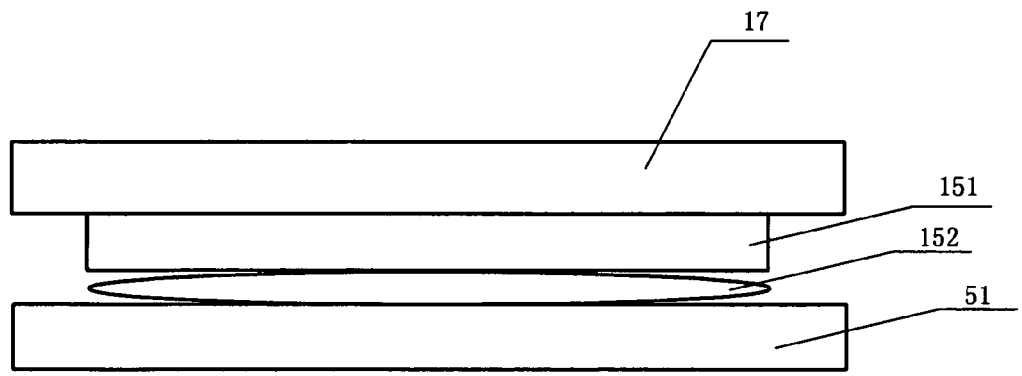
FIG. 7 is a status schematic view showing the liquid producing layer 152 in the method embodiment for producing the polarizer of the present invention.

FIG. 5 is a flowchart showing the method embodiment for producing the polarizer of the present invention. The method specifically includes the following steps:

In Step 101; disposing a cathode 13 and an anode 14 on the glass substrate 51 in parallel as shown in FIG. 6;

In Step 102, connecting the cathode 13 and the anode 14 to an external direct current (DC) power supply 16;

In Step 103, dropping solution 15 containing metal positive ions between the cathode 13 and the anode 14, dropping blended water solution 15 containing the metal positive ions evenly between the cathode 13 and the anode 14 which are disposed in parallel, and disposing another glass substrate (i.e., up glass substrate 17) flatly onto it;

In Step 104, disposing the up glass substrate 17 onto the cathode 13 and the anode 14;

In Step 105, adjusting temperature of the solution until the solution 15 freezes, which adjusts temperature of the solution 15 so as to freeze the solution 15 to be a flat ice block by disposing a cooling/heating substrate 11 at bottom of the glass substrate 51 as shown in FIG. 6;

In Step 106, adjusting temperature until a liquid layer 152 appears between the glass substrate 51 and ice 151 as shown in FIG. 7, which adjusts thickness of the ice 151 on the glass substrate 51 and constructs an ultrathin liquid layer 152 between the glass substrate 51 and the ice 151 by disposing the above device in the present embodiment within a growth chamber 10 which can perform cooling and adjusting temperature in the growth chamber 10, as shown in FIG. 6.

In Step 107, supplying power for the cathode 13 and the anode 14; switching on the DC power supply 16 and adjusting a voltage value to supply power to the cathode 13 and the anode 14, so that positive ions in the ultrathin liquid layer 152 are combined with electrons and deposited on the cathode 13, and after a while, the metal wire grating will align on the glass substrate 51 in parallel; and In Step 108, switching off power and removing the up glass substrate 17, the cathode 13 and the anode 14 so as to obtain the polarizer.

The glass substrate 51 and the up glass substrate 17 may be a glass substrate commonly used in an LCD device. The cathode 13 and the anode 14 may be a metal with high conductivity and low cost such as copper and aluminium, in a shape of thin wire whose length is 5 cm-15 cm, width is 30 μm-50 μm, and height is 20 μm-30 μm, distance between two metal thin wires is 1 cm-10 cm. The water solution 15 containing the metal positive ions may be dilute solution containing the metal positive ions such as copper and aluminium, which is blended by using deionized water and has a concentration of 0.02 mole per liter-0.05 mole per liter. The DC power supply 16 may have a voltage value of 0.4V-0.6V. The width of the metal wire and the cycle of the metal wire grating may be changed by adjusting the concentration of the solution 15 and the voltage value of the DC power supply 16.

In the above method embodiment, the polarizer can be obtained simply by temperature adjustment and ionization reaction, which can omit troublesome processes such as the pre-processing to the TAC film, the stretching to the PVA film, and the film pasting in the existing producing process of the polarizer so as to greatly simplify the producing process of the polarizer and lower the producing cost of the polarizer.

Figure 8:
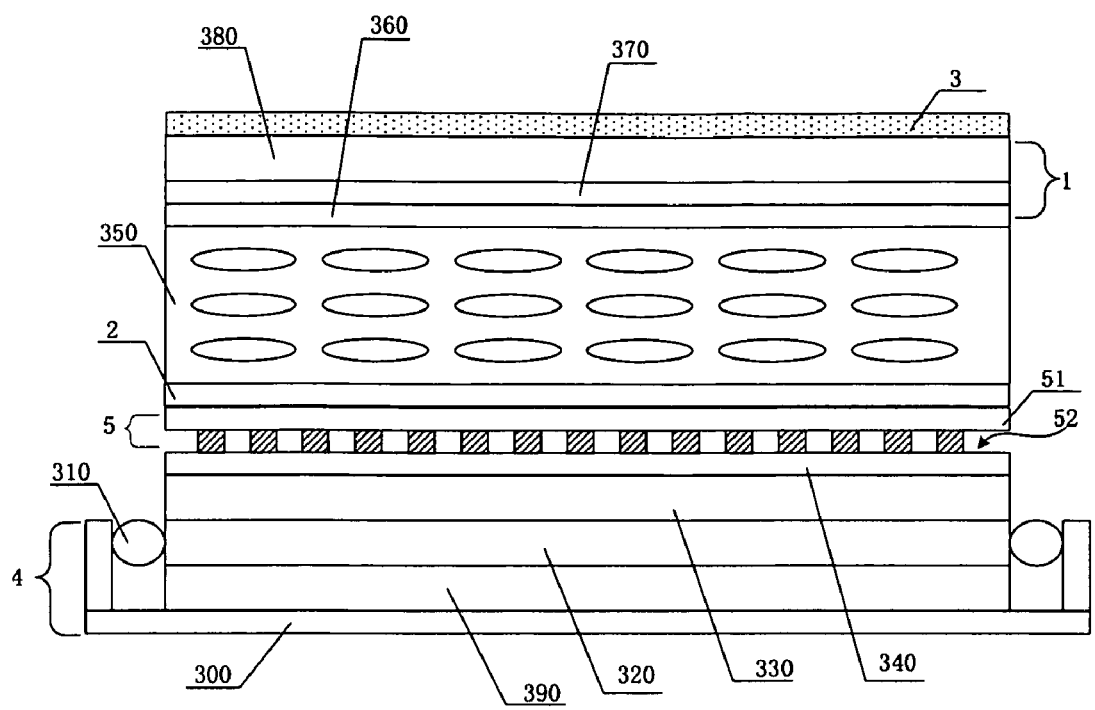
FIG. 8 is a structural view showing the Embodiment 1 of the LCD device according to the present invention.

FIG. 8 is a structural view showing the Embodiment 1 of the LCD device according to the present invention. The LCD device includes a polarizer 5 disposed between the TFT array substrate 2 and the backlight 4. The glass substrate 51 of the polarizer 5 is contacted with the TFT array substrate 2. The polarizer 5 may be any one of the polarizers in the above polarizer embodiment.

In the present embodiment, an appropriate distance can be kept between the color filter substrate 1 and the TFT array substrate 2 by using spacers. An the liquid crystal layer 350 can be formed by a method of vacuum injection or one drop filling (ODF) which fills liquid crystal material among the spacers. The edges of the color filter substrate 1 and the TFT array substrate 2 are sealed and solidified by resin material. The polarizer 5 of the present invention is disposed on the TFT array substrate 2. An existing polarizer 3 is pasted on the outside of the color filter substrate 1, i.e., the top of the color filter substrate 1, i.e., the top of the whole LCD device in FIG. 8. In addition, the LCD device in the present embodiment also needs to be provided with a corresponding driving circuit and form the LCD device together with the backlight 4.

The TFTs on the TFT array substrate 2 may be produced by an existing technique of amorphous silicon (a-Si) or low temperature poly silicon (LTPS). The liquid crystal layer 350 can be disposed in an existing twisted nematic (TN) mode, an optically compensated bend (OCB) mode, an in-plane-switching (IPS) mode, a fringe field switching (FFS) mode, and a vertical alignment (VA) mode. The light source 310 in the backlight 4 may be a cold cathode fluorescent lamp (CCFL) or a light emitting diode (LED).

In the present embodiment, the lights emitted from the light source 310 pass through the light guide plate 320, the diffusion chip 330 and the selective permeation film 340, and then reach on the polarizer 5. The lights perpendicular to the metal wires in the metal wire grating 52 permeate, then pass through the liquid crystal layer 350 and the color filter substrate 1, and form an image entering human eyes. The lights parallel to the metal wires in the metal wire grating 52 are reflected by the polarizer 5, then pass through the selective permeation film 340, the diffusion chip 330 and the light guide plate 320, and enter the reflective film 390, which can be utilized repeatedly after passing through the reflective film 390 so as to improve the utilization rate of lights in the LCD device and the brightness of the LCD device.

Figure 9:
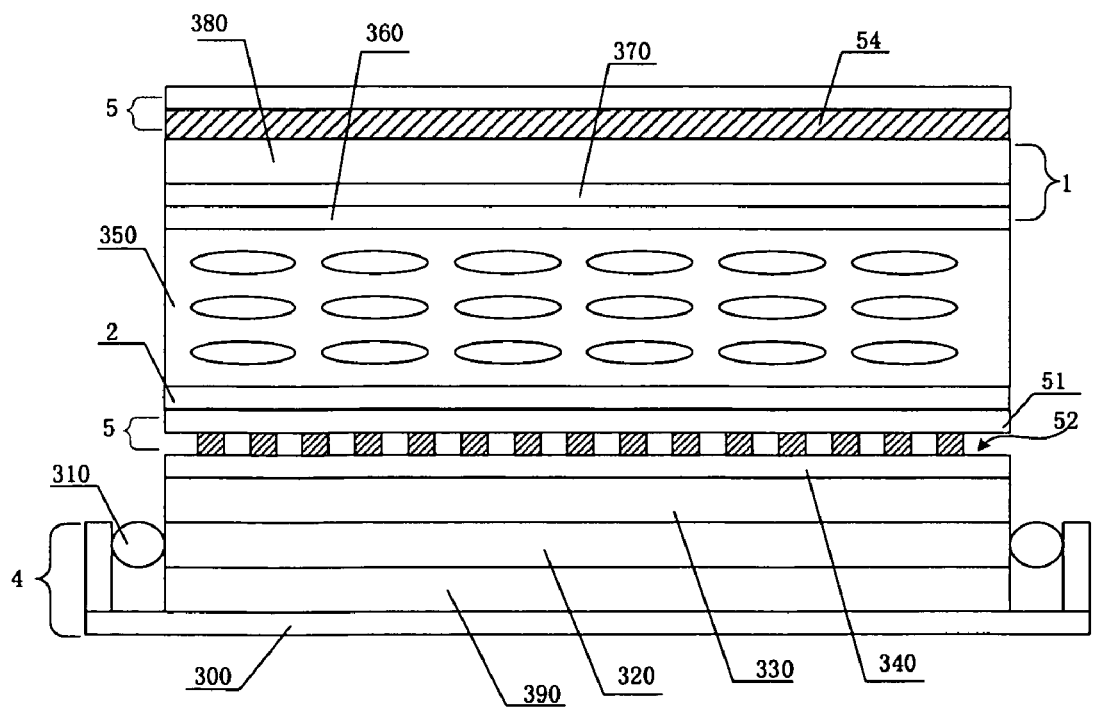
FIG. 9 is a structural view showing the Embodiment 2 of the LCD device according to the present invention.

FIG. 9 is a structural view showing the Embodiment 2 of the LCD device according to the present invention. The structure of the present embodiment is substantially the same as that of the Embodiment 1 of the LCD device with difference that a polarizer 5 in the present invention disposed on the color filter substrate 1 replaces the existing polarizer 3, that is, in the present embodiment, the conventional polarizer 3 pastes in the LCD device is replaced by the polarizer 5 with the metal wire grating produce according to the present invention, and the alignment direction of the metal wires in the metal wire grating 54 of the polarizer 5 is perpendicular to the alignment direction of the metal wire grating 52 so as to further improve the utilization rate of lights and further lower the producing cost of the LCD device.

In the above LCD device embodiment, the glass substrate of the polarizer 5 may be replaced by the TFT array substrate 2 in the LCD device, that is, the metal wire grating 52 may be directly disposed under the TFT array substrate 2 so as to further reduce the thickness of the LCD device while the cost of the LCD device is lowered and the utilization rate of lights are improved.

Besides, the polarizer above the color filter substrate of the LCD device may be removed. A metal wire grating may be disposed above the glass substrate 380 of the LCD device, whose alignment direction is perpendicular to the alignment direction of the metal wire grating under the TFT array substrate 2. A protection film is disposed above the metal wire grating for protecting the metal wire grating. Alternatively, the polarizer above the color filter substrate of the LCD device may be removed. A metal wire grating may be disposed between the glass substrate 380 and pixel color film layer 370 of the LCD device, whose alignment direction is perpendicular to the alignment direction of the metal wire grating under the TFT array substrate 2 so as to further reduce the thickness of the LCD device and meet the increasingly high need of ultrathin type while the cost of the LCD device is lowered and the utilization rate of lights are improved.

Finally, it should be understood that the above embodiments are only used to explain, but not to limit the technical solution of the present invention. In despite of the detailed description of the present invention with referring to above preferred embodiments, it should be understood that various modifications, changes or equivalent replacements can be made by those skilled in the art without departing from the scope of the present invention and covered in the claims of the present invention.

What is claimed is:

1. A method for producing a polarizer, comprising:
    disposing a cathode and an anode in parallel on one glass substrate;
    connecting the cathode and the anode to a direct current power supply;
    dropping solution containing metal positive ions between the cathode and the anode;
    disposing another glass substrate on the cathode and the anode;
    adjusting temperature of the solution until the solution is frozen to be ice;
    adjusting the temperature until a liquid layer appears between the one glass substrate and the ice;
    supplying power for the cathode and the anode; and switching off the power and removing the another glass substrate, the cathode and the anode.

2. The method according to claim 1, wherein the step of adjusting temperature of the solution until the solution is frozen to be ice specifically comprises: disposing a cooling/heating substrate under the one glass substrate and adjusting the temperature by using the cooling/heating substrate.

3. The method according to claim 1, wherein the step of adjusting the temperature until a liquid layer appears between the one glass substrate and the ice specifically comprises:
disposing the one glass substrate, the cathode, the anode, the solution and the another glass substrate within a growth chamber which can perform cooling, and adjusting the temperature by adjusting indoor temperature of the growth chamber.

4. The method according to claim 1, wherein a length of the cathode and a length of the anode are both 5 cm-15 cm, a width of the cathode and a width of the anode are both 30 μm-50 μm, a height of the cathode and a height of the anode are both 20 μm-30 μm.

5. The method according to claim 1, wherein distance between the cathode and the anode is 1 cm-10 cm.

6. The method according to claim 1, wherein a concentration of the solution is 0.02 mol per liter-0.05 mol per liter.

7. The method according to claim 1, wherein a voltage of the direct current power supply is 0.4V-0.6V.

* * * * *